(12) United States Patent
Berberian et al.

(10) Patent No.: US 8,364,142 B1
(45) Date of Patent: Jan. 29, 2013

(54) SYNCHRONIZING MOBILE STATION MOST RECENTLY USED MRU LIST WITH CARRIER SYSTEM PREFERENCE LIST

(75) Inventors: Joseph Berberian, Towaco, NJ (US); Eugene Carucci, Oxford, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 448 days.

(21) Appl. No.: 12/774,490

(22) Filed: May 5, 2010

(51) Int. Cl.
*H04W 4/00* (2009.01)
(52) U.S. Cl. ............... 455/432.1; 455/434; 370/332
(58) Field of Classification Search ........... 455/432.1, 455/434, 435.2, 452.1, 509; 370/332
See application file for complete search history.

(56) References Cited

U.S. PATENT DOCUMENTS

| | | | |
|---|---|---|---|
| 2004/0219916 A1* | 11/2004 | Kim et al. ............... | 455/435.3 |
| 2007/0197211 A1 | 8/2007 | Lee et al. | |
| 2008/0081616 A1* | 4/2008 | Zhao et al. ............... | 455/432.1 |
| 2008/0102825 A1* | 5/2008 | Joo ............... | 455/432.1 |
| 2009/0075650 A1 | 3/2009 | Jung | |
| 2009/0075652 A1* | 3/2009 | Jung et al. ............... | 455/434 |
| 2010/0003590 A1* | 1/2010 | Park et al. ............... | 429/144 |
| 2010/0111043 A1* | 5/2010 | Balasubramanian et al. | 370/332 |
| 2010/0184433 A1* | 7/2010 | Plestid ............... | 455/435.2 |

OTHER PUBLICATIONS

Preferred Roaming List retrieved on May 18, 2009 <http://en.wikipedia.org/wiki/Preferred_Roaming_List>.
"Recommended System Selection Requirements for 1X and 1xEV-DO-Capable Terminals," CDG Document 143, version 1.1, Mar. 15, 2007.
"TIA/EIA/IS-683-A: Over-the-Air Service Provisioning of Mobile Stations in Spread Spectrum Systems," TR 45, May 1998 with particular interest to pp. 3-42 to 3-51.

* cited by examiner

*Primary Examiner* — Kamran Afshar
*Assistant Examiner* — Khawar Iqbal

(57) ABSTRACT

To correct any discrepancies between the system identifiers captured in a Most Recently Used (MRU) list and those in the latest system preference list (e.g. Preferred Roaming List (PRL) or Public Land Mobile Network (PLMN) list), a mobile device will periodically check a system selection that utilized the MRU list against the carrier's system preference list and when necessary initiate a new scan to select a system based on the current preference list. The device then updates system identification in the MRU list, based on the new system selection obtained in accordance with the preference list.

12 Claims, 4 Drawing Sheets

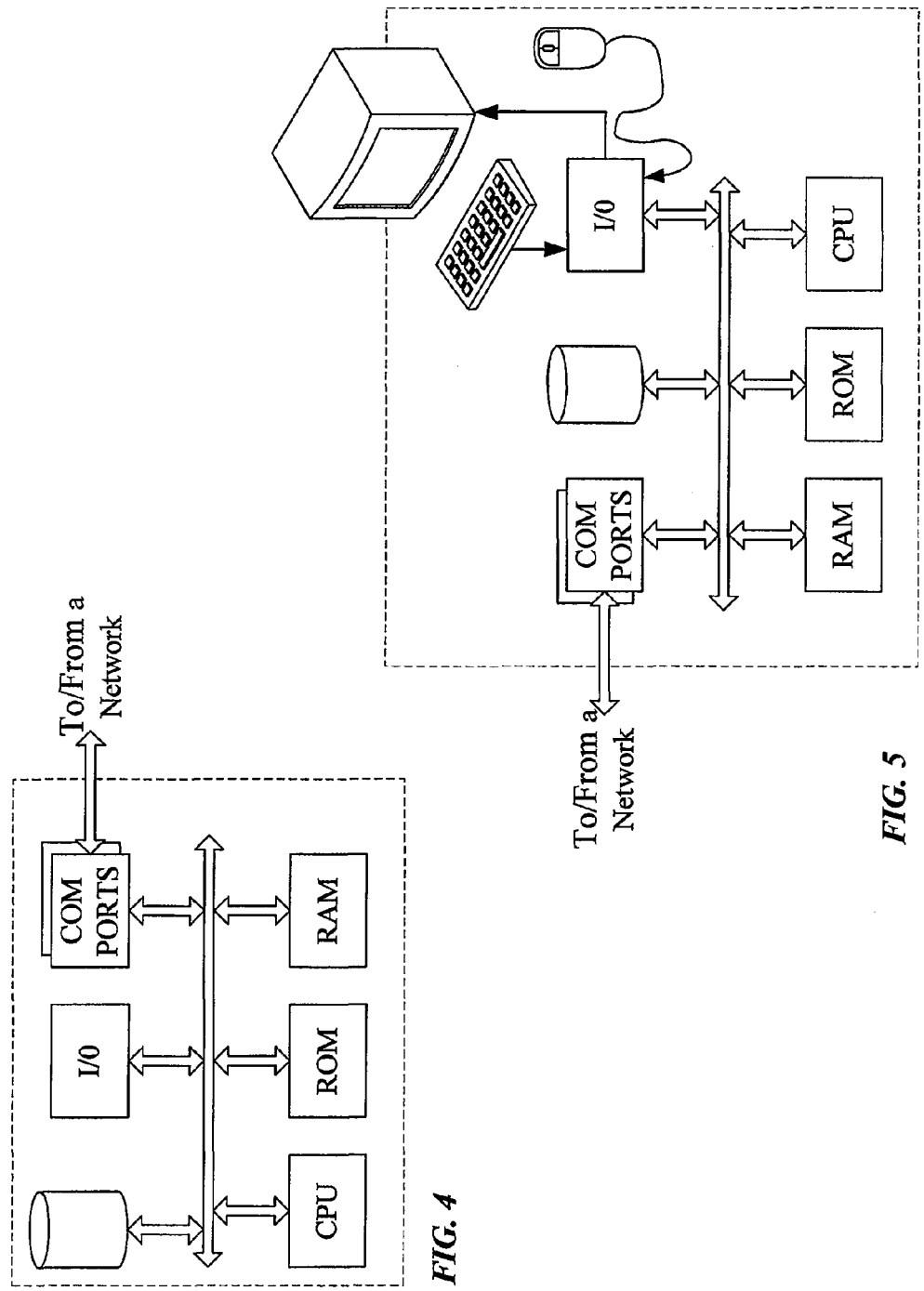

SYNCHRONIZING MOBILE STATION MOST RECENTLY USED MRU LIST WITH CARRIER SYSTEM PREFERENCE LIST

TECHNICAL FIELD

The present subject matter relates to technologies to effectively manage and implement system selection for a mobile device, particularly in a manner that syncs a list of most recently used systems with a list of preferred systems to provided by the carrier offering service to the mobile device.

BACKGROUND

In recent years, use of mobile communications devices for voice telephone services, email or text messaging services and even multi-media services has become commonplace, among mobile professionals and throughout the more general consumer population. To support broad customer's efficient acquisition of mobile communication networks, many mobile devices today are capable of using various networks and even different network technologies in many different regions, and increasingly, in different countries.

For the efficient acquisition of mobile communication networks, the carriers and their equipment vendors have developed and standardized a number of techniques for selecting systems in different areas for acquiring the network and obtaining service therefrom, in accordance with preferences of the subscriber's service provider/carrier. However, since the 3GPP2 and 3GPP standards bodies are working independently, the system selection procedures that they have established are different and use databases that are structured differently. 3GGP2 uses a Preferred Roaming List (PRL) that contains a table which identifies all of the operators that are roaming partners and which lists those partner operators in priority order. 3GPP uses Public Land Mobile Network (PLMN) lists to do the same.

Searching and acquiring a network, using a full PRL or PLMN search, however, takes considerable time and is typically done when a device is first turned-on or has lost all network service for some period of time. Each network listing in a typical preference list, e.g. in a PRL, might include a system ID (SID), a network ID (NID), a channel identification, and identification of a Radio Frequency Band, for each system and be classified by a geographic information index. The search may be time consuming, especially if a system has one or more configurable system parameters, and each such parameter can have one of multiple possible values. In this case, the station may perform acquisition for different possible combinations of values for the configurable system parameters in order to detect the system. Search and acquisition for a large number of possible combinations of parameter values from a long PRL or PLMN may extend search time and consume excessive battery power, both of which are undesirable.

For faster acquisition in other cases, for example, when the mobile device has been powered off briefly or in some cases when the device disconnects from one system while roaming, the device normally searches using a Most Recently Used (MRU) list having information of some much smaller number the most recently connected systems. The MRU list includes modes (CDMA, AMPS, EV-DO, etc.), band classes (Cellular, PCS, etc.) and channels of the most recently used systems. When an network is not found that matches a listing in the MRU list, the mobile device may turn to a more extensive search based on the PRL or PLMN. In this later case, if the device selects a new system, the device adds the system as a new entry in the MRU list for future use.

In this fashion, the MRU data is compiled over time from systems selected based on the carrier's preference list (PRL or PLMN). The preferences and thus the list or lists may change over time, as the carrier changes. To update the preference functionality of the devices of the carrier's customers, updated versions of the PRL or PLMN are provided to the mobile station over the air from time to time by the wireless communication provider. When a PRL is sent to a mobile device, the device does not use the new version until complete loss of signal or catastrophic power loss. Hence, as a result of an update, the acquisition data for one or more systems listed in the MRU may no longer conform to the carrier's latest preferences. In addition, the MRU can become swayed to one channel over the preferred channel due to channel assignment. Selection of such a system via the MRU, therefore, may no longer result in the most favorable financial roaming treatment.

Hence a need exists for technology to correct any discrepancies between the system identifiers captured in the MRU and those in the latest system preference list (e.g. PRL or PLMN) received from the carrier.

SUMMARY

The teachings herein improve over previous technologies and address the need outlined above by periodically checking current system selection obtained using the MRU list against the carrier's system preference list and when necessary initiating a new scan to select a system based on the current preference list and then update system identification in the MRU based on the new system selection obtained in accordance preference list.

For example, a disclosed methodology relates to managing a most recently used (MRU) system identification list of a mobile device. The mobile device scans for available mobile communication network systems and selects at least one available mobile communication network system found during the scanning, in accordance with a system preference list stored in the mobile device from a carrier providing service to the mobile device. The device stores an identification of each selected mobile communication network system in the MRU list in the mobile device. During subsequent scanning for available mobile communication network systems, the mobile device selects at least one available mobile communication network system in accordance with the MRU. However, the device may receive and store an update of the system preference list from the carrier providing service. Hence, the management method also involves periodically comparing an identification of the system selected in accordance with the MRU to the stored update of the system preference list. When the identification of the system selected in accordance with the MRU does not match an entry in the stored update of the system preference list, then the mobile device scans for available mobile communication network systems and selects an available mobile communication network system, in accordance with the stored update of the system preference list. For this scanning, the mobile device stores an identification of the mobile communication network system selected in accordance with the stored update of the system preference list, in the MRU list.

Although the system preference list from the carrier providing service to the mobile device may be a PLMN for a 3GPP device, for a CDMA mobile device as discussed in the specific detailed examples, that list is a PRL. Various intervals may be used for the periodic comparison, but in the detailed example discussed below, the mobile device performs the comparison as part of its periodic processing for time based registration.

Any of the disclosed methods of managing a most recently used (MRU) system identification list to conform with the carrier's preference list, as outlined above, may be implemented as various combinations of method technologies, mobile station hardware and associated software (program instructions and selection lists). A mobile station, for example, may be programmed or otherwise configured to implement the method of list management and perform associated system acquisition based on the MRU and the carrier's preference list. Software may be downloaded from system hardware connected to communicate with the mobile station directly or via the network(s). System hardware may comprise special purpose hardware or one or more general purpose devices programmed to implement the software download functions. A software product includes at least one machine-readable medium and information carried by the medium. The information carried by the medium may be executable program code and data for the various lists, which enable a programmable mobile station device to implement the MRU list management and related system selection and acquisition functions like those discussed in more detail below.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

FIG. 4 illustrates a network or host computer platform, as may typically be used to implement a server.

FIG. 5 depicts a computer with user interface elements, as may be used to implement a personal computer or other type of work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The examples described below encompass a technique that allows a mobile station to correct any discrepancies that may occur between an MRU list and a carrier's most recent system preference list. In one example, a mobile wireless communication service provider provides a PRL list, which reflects available systems of an area where the mobile station is located, to the mobile station periodically. After receiving an update of PRL list, the mobile station periodically compares system selections made with a MRU table against the list of the PRL provided by the service provider. When recently used systems in the MRU table matches with the list of the PRL, the mobile station does not need to scan again for available networks and performs a normal operation. When the recently used system selected via the MRU table does not match with the list of the PRL, the mobile station scans available networks for acquisition of a system using the PRL to select most preferred available system and adds the system, to the MRU table.

For discussion of the invention, structures of a Most Recently Used (MRU) list and a Preferred Roaming List (PRL) are explained, although other preference lists such as PLMN may apply. The MRU is a mechanism that enables a mobile station to remember the most recently used systems (mode, band and channel) on which a wireless communication service was provided. Each MRU entry contains information about the mode (CDMA, AMPS, DO, etc.), band class (Cellular, PCS, etc.) and channel. The MRU is saved into a memory of the mobile station during power-down to speed up system acquisition the next time the mobile station is powered up.

The PRL is a data structure set up by the wireless service provider and programmed into the mobile station, which may be provided or updated over the air. The PRL instructs the mobile station where to look for service and whether it is usable when a system is acquired. The PRL specifies roaming indicators to be displayed when providing a service on a particular system. The PRL consists of an acquisition table, an indexed list of frequencies on which the mobile station may search for particular systems, and a system table, a prioritized list of systems that the mobile station is permitted to access and is explicitly forbidden to access.

Figure 1:
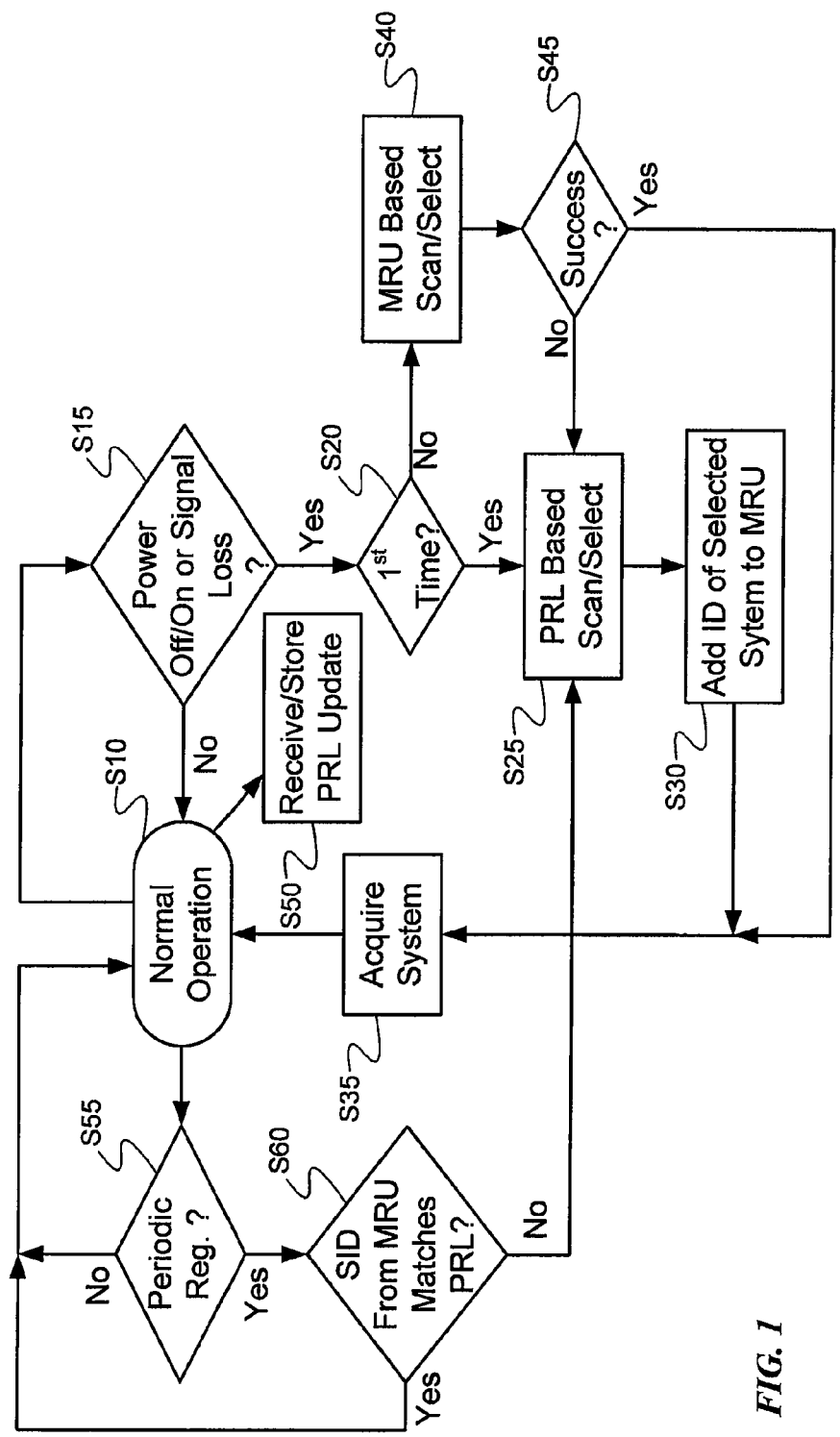
FIG. 1 is a flow diagram of certain mobile device operations, including those for periodically checking MRU based system selections against a PRL.

FIG. 1 is a flow diagram of mobile device operations for periodically checking MRU based system selections against a PRL. The process disclosed in FIG. 1 purports to quickly acquire the most preferred system that is available in the location where the mobile station is powered up or reconnects to a wireless network. Various steps flow from normal operation. (S10) In a normal operation of the mobile station, the mobile station checks whether the mobile station powers on or off or loses a signal from a pre-connected system or not. (S15) A mobile station performs a normal operation to acquire an available preferred system by referring to the PRL or MRU, when the mobile station keeps operating without power off or losing a signal from the system. (S10) The mobile device normally stores a PRL, and at some point, the updated PRL is provided by the wireless service provider over the air periodically or randomly to inform the mobile station of the currently preferred systems in the area where the mobile station exists. A PRL update is received and stored in the mobile station. (S50) The PRL includes system ID (SID), a network ID (NID), a channel and a radio frequency band, classified by a geographic information index. The MRU reflects information of the most recently connected system, such as modes (CDMA, AMPS, DO, etc.), band classes (Cellular, PCS, etc.) and channels of the most recently used systems.

From time to time user may turn the mobile off or the mobile station may lose signal from a mobile system, as reflected by the branching from normal processing at step S15 in the drawing. When the mobile station is powered on or has lost to a system signal (S15), it is checked whether this is the first time occurrence for the mobile device. (S20) This ensures that the mobile station has a MRU list therein, since the mobile would not have any MRU list when the mobile station has never powered on previously.

If the mobile station's power up is not the first time, the mobile station stores the MRU list, to which the mobile station refers to for obtaining a system, therein before the mobile station powers off previously. The mobile station refers to the MRU stored in the mobile station to obtain scan for, select and acquire a system with which to establish a radio link with. (S40) If the mobile station obtains a system by referring to the MRU (S45), the system is successfully acquired and the mobile station performs a normal operation. (S35).

If the mobile station cannot obtain an available system in the area where the mobile station is present by referring to the MRU, the mobile station refers to the PRL to acquire an available system. (S25) In this case, the MRU does not reflect available systems in the area where the mobile station stays, because, for example, the mobile station user may have moved from the area where the mobile station is powered off and a MRU for that area is stored in the mobile station, to another area where available systems do not correspond to the systems in the MRU. Also the mobile station powers on for the first time (yes branch from step S20), the mobile station refers to the PRL to obtain an available system, since the mobile station has never acquired a system, and a MRU is not stored in the mobile station. (S20, S25) If the mobile station acquires an available system based on the PRL, an identification of the acquired system is added to the MRU stored in the mobile station. (S30) The mobile station performs a normal operation via the acquired system. (S35)

One or more parameters cause the mobile device to perform certain functions periodically and one of those parameters trigger checking of a system against the PRL. In one example, during normal operation, the mobile device checks whether or not the Time Based Registration interval defined by the I-95 standard has expired. (S55) In addition to its normal operations upon time occurring for periodic registration, the mobile device checks the system identification (SID) of the current selection against the PRL. (S60)

In this way, after receiving the new or updated PRL lists, every the Time Based Registration interval, the mobile station determines whether a system selected, typically using the MRU table matches, with a prioritized list of systems in the most recently provided PRL list. (S60) Order of the systems and systems in the MRU table are compared with order of the systems and systems in the PRL one by one.

If the system selected based on the MRU table matches with the most preferred frequencies and channels in the PRL list, the mobile station remains idle without scanning available networks in the area, and performs a normal operation. (S10) If system selected based on the MRU table does not match with the list of systems in the PRL list, the mobile station scans available networks based on the newly provided PRL list, since this indicates that the MRU entry used for the selection does not match the latest carrier preferences. (S25) This matching procedure resolves a disparity between the MRU table and the PRL list, and reduces mobile device acquisition of less favorable systems based on outdated data.

Figure 2:
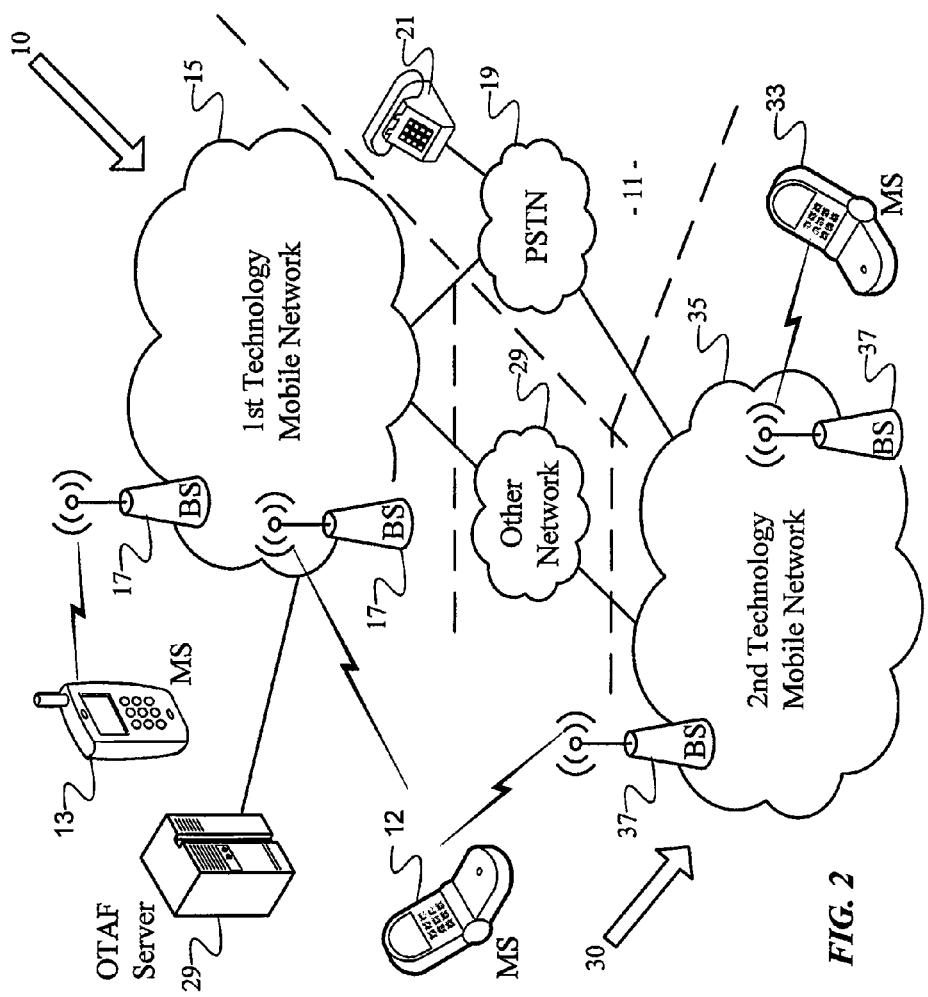
FIG. 2 is a functional block diagram of an exemplary system of wireless networks for providing mobile voice telephone services and various data services based on which the procedures of FIG. 1 may be implemented.

FIG. 2 is a functional block diagram of an exemplary system of wireless networks for providing mobile voice telephone services and various data services based on which the procedures of FIG. 1 is implemented. For discussion purposes, the diagram shows two wireless networks 10 and 30 operated in accord with different technology standards. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile stations. For purposes of later discussion three mobile stations 12, 13 and 33 appear in the drawing. The elements indicated by the reference numerals 10 and 30 generally are elements of the respective operator's network, although the mobile stations 12, 13 and 33 typically are sold to the carrier's customers. Today, mobile stations typically take the form portable handsets, smart-phones or personal digital assistants, data cards for computers, although they may be implemented in other form factors. Each mobile communication network 10 or 30 provides communications between mobile stations 12, 13 and 33 as well as communications for the mobile stations with other networks and stations shown generally at 11 outside the mobile communication networks. An inter-carrier or other intermediate network 29 may provide communication connectivity between the mobile communication networks 10 and 30.

Each network 10 and 30 allows users of the mobile stations operating through the respective network to initiate and receive telephone calls to each other as well as through the public switched telephone network (PSTN) 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a 3GPP2 (1XRTT and EVDO) technology network, whereas the network 30 is a 3GPP (LTE/GSM/UMTS) technology network.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13, when the mobile stations are within range. The BTS is the part of the radio network that sends and receives RF signals to/from the mobile stations that the base station currently serves. Hence, in our example, the BTS would utilize 3GPP2 (1XRTT and EVDO) type transceiver equipment and implement communications in accord with the protocols of the applicable 3GPP2 standard, for signaling, registration, voice communication, data communication, etc. For example, each base station 17 will broadcast certain standardized information to allow a mobile station 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile stations 12, 13 between the base stations 17 and other elements with or through which the mobile stations communicate. Individual elements such as switches and/or routers forming the traffic network 15 are omitted here for simplicity. Although not separately shown, the network 15 will include or connect with a number of service control elements, for authenticating mobile stations to use the network 10, for authenticating mobile device users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers 25. The drawing shows one user terminal device as a personal computer (PC) at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile stations to enable they operation via the network 10. Of note for purposes of the present discussion of the enhanced network or system selection function, one or more such systems provide the capability to download at least the lists and/or updates thereof into the mobile stations of the network operator, in this example, via the networks. These systems may also support downloading of the executable programming for the system selection via the networks, to initially install such programming in the mobile stations or to fix or update the programming in the mobile stations over time. An example of such a system that may facilitate programming and/or list downloading via the networks is the Over-The-Air service activation/provisioning Function (OTAF) 29. In the example, the OTAF 29 may be a server connected to the traffic network 15, to enable the server to communicate with the mobile stations of the network operator's customers. The programming to implement the procedures of FIG. 1 and PRL lists may be provided by the OTAF 29 server.

As noted earlier, many mobile wireless communications networks have been deployed and are available today. For purposes of discussion the example of FIG. 2 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a 3GPP2 (1XRTT and EVDO) technology network, and in the example, the network 30 is a 3GPP (LTE/GSM/UMTS) technology network.

Like the network 10, the physical elements of the radio access network (RAN) 30 include a number of base stations (BSs) 37, each of which includes a base transceiver system (BTS) and associated antenna system. In our example, each BTS of a base station 37 would utilize 3GPP (LTE/GSM/UMTS) type transceiver equipment and implement communications in accord with the protocols of the applicable 3GPP standard, for signaling, registration, voice communication, data communication, etc. For example, each base station 37 will broadcast certain standardized information to allow a mobile station 12 or 33 in the region to search for, find and lock-onto the base station 37 and acquire information needed to register and initiate communications via the network 30, all in accord with the standard 3GPP protocols.

The radio access network portions of network 30 also include a traffic network represented generally by the cloud at 35, which carries the user communications for the mobile stations 12, 33 between the base stations 37 and other elements with or through which the mobile stations communicate. Individual elements such as switches and/or routers forming the traffic network 35 are omitted here for simplicity. Although not separately shown, the network 35 will include or connect with a number of service control elements, for authenticating mobile stations to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile stations and regular telephones 21 connected to the PSTN 19. The traffic network portion 35 of the mobile communication network 30 also connects to a public packet switched data communication network, such as the network commonly referred to as the "Internet" shown at 23, for various mobile station communications with servers 25 and/or user terminal devices 27. Although omitted for simplicity, the network 30 may also include various systems that provide ancillary functions in support of the communications services provided through the network 30, such as a system similar to the OTAF 29 for providing data and/or programming downloads to the mobile stations of the network operator's customers.

Using the networks of FIG. 2 as an example, the algorithm provides the flexibility for a mobile station such as 12 to select between the 3GPP2 (1XRTT and EVDO) technologies of network 10 and the 3GPP (LTE/GSM/UMTS) technologies of network 30 as well as specific operators' networks for domestic and international roaming.

Assume that the mobile station 12 has dual mode capability to utilize both 3GPP2 and 3GPP technology networks. Via the OTAF server 29 or other means, the operator that provides service to the customer has installed the system selection programming to implement the algorithm of FIGS. 1 to 3 in the mobile station 12 and has downloaded the various lists discussed earlier relative to those flow charts. We will assume for discussion purposes that the station 12 is in an area where it can detect base station signaling from both networks 10 and 30 and therefore could use either one of those two networks upon selection and registration.

At a high level, the mobile station 12 identifies the country of current operation, typically from over-the-air signaling received from a base station 17 or 37 of a network in the current area of operation. The mobile station 12 uses its stored high order list, which identifies a preferred technology for each of the countries in which the operator's mobile stations may roam and obtain service, to initially select the preferred technology for the region within which the mobile station is currently operating. Although in many locations around the world the preference may be for 3GPP technology, for discussion purposes, assume that the mobile station 12 is operating in the US, and based on its high order list processing selects 3GPP2 as the preferred technology.

As discussed, the mobile station also utilizes a number of network or system preference lists supported by respective standards for the various network technologies that the mobile station is capable of using. In our current example, the mobile station device supports 3GPP2 technologies and 3GPP technologies, therefore the device has one or more PRL type lists for 3GPP2 network selection and one or more PLMN lists for 3GPP network selection. Having picked one of the technologies based on the country and the high order technology preference list, the 3GPP2 technology in the present example, the mobile station uses the selected one of the technologies to search for the most preferred network or system of the particular technology type using the corresponding system or network selection list. Essentially, the mobile station scans for system identifiers using the selected technology communications and picks the detected network or system of that technology that has the highest priority as indicated on the list corresponding to the selected technology. In the example of FIG. 2, since the 3GPP2 technology is preferred in the US, the mobile station 12 searches for a 3GPP2 network. Upon detection of the signaling from a base station 17 of the 3GPP2 type network 10, the mobile station determines the priority of the detected network from the PRL processing. If the detected network is sufficiently high (or no higher network is detected through the search and PRL processing), then, the mobile station 12 will select and register for communication via that identified network 10.

Figure 3:
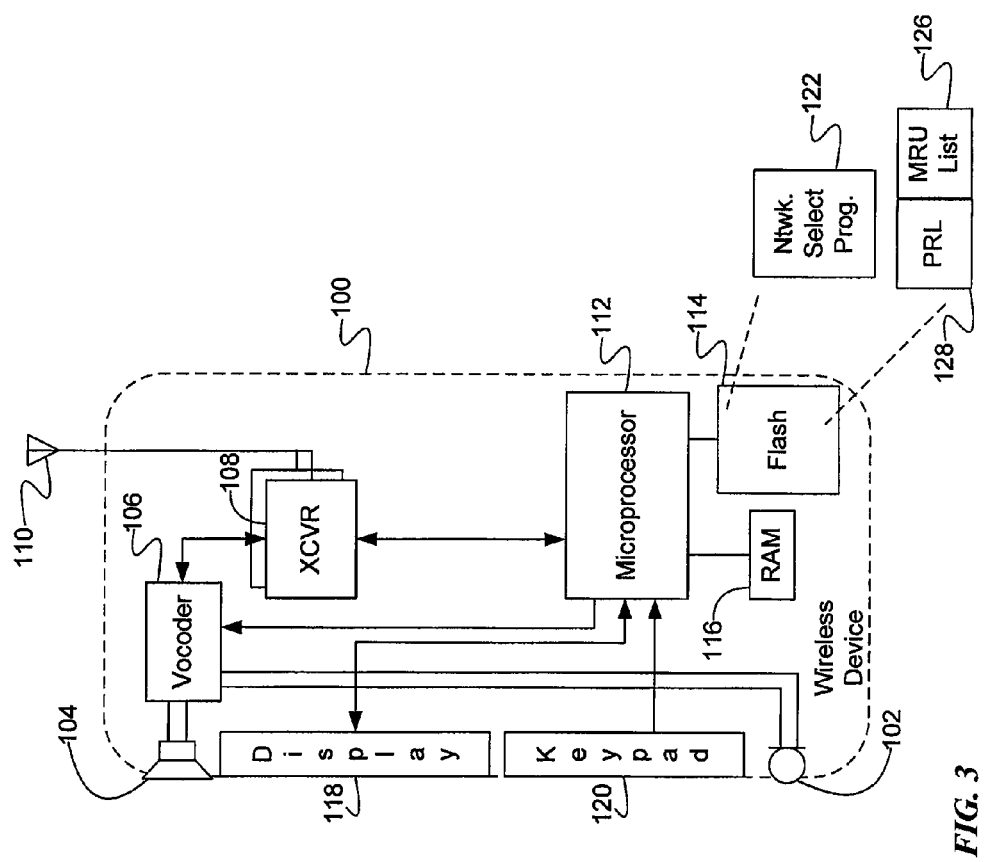
FIG. 3 illustrates a block diagram of an exemplary mobile station.

FIG. 3 provides a block diagram illustration of an exemplary mobile station 100, which may be the mobile station 12, 13 or 33 of a customer of any of the network operators. Although the mobile station 100 may be a smart-phone or may be incorporated into another device, such as a portable personal computer, personal digital assistant (PDA) or the like, for discussion purposes, the illustration shows the mobile station 100 in the form of a handset. The handset embodiment of the mobile station 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The handset 100 is a multimode device capable of operations on various technology type networks, such as the networks 10 and 30. For example, the handset 100 may utilize either or both of 3GPP2 (1XRTT and EVDO) technologies and 3GPP (LTE/GSM/UMTS) technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

Transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and the communication network (described earlier with regard to FIG. 2). Each transceiver 108 connects through RF send and receive amplifiers (not separately shown) to an antenna 110. In the example, the transceiver 108 is configured for RF communication in accord with a digital wireless protocol, such as the current 3GPP2 and 3GPP protocols. For the network selection function, network communications via the transceiver 108 and antenna 110 will include detection of the available network technology types in any given service area and selection of an available network for communications using the algorithm discussed above relative to FIG. 1. The network communications may also support downloading of selection programming and list data and/or updates thereof from a server such as the OTAF server 29.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the mobile station 100, in that it controls all operations of the mobile station 100 in accord with programming that it executes, for all normal operations, and for operations involved in selecting a preferred technology and selecting an available network of the appropriate technology type, for mobile communications. In the example, the mobile station 100 includes flash type program memory 114, for storage of various "software" or "firmware" program routines and mobile configuration settings, such as mobile directory number (MDN) and/or mobile identification number (MIN), etc. The mobile station 100 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming 122 stored in the flash type program memory 114, sometimes referred to as "firmware," is loaded into and executed by the microprocessor 112.

The executable programming stored in the flash memory 114 will include a network selection program module 122. The data stored in the flash memory 114 will include the various lists used to select a technology or mode and select a network, in accord with the algorithm, such as the high order list(s) 124, the PLMN list 126 and the PRL list 128.

3GPP variants of the mobile devices often utilize a Subscriber Identity Module or "SIM" card (called UICC in the 3GPP standards documents—universal integrated circuit card), which provides secure storage for various data needed for operation of a mobile station, such as data identifying the mobile station to the network (e.g. MDN and/or MIN). However, the SIM card is a standardized removable module can be moved from one mobile station device to another, to effectively move the mobile station identity from one device to another. As discussed above, the list data can be downloaded into flash memory or the like in the mobile station. In implementations using SIM cards, another approach would be to download at least the list data to SIM card storage. In existing 3GPP mobile devices, PLMN lists are stored on the SIM card. In which case, the higher order list(s) and/or PRL also could be on the SIM card or could be stored in other memory (e.g. flash memory) in the mobile station.

As shown by the above discussion, functions relating to the selection of a network for wireless communications to take advantage of the most favorable roaming agreements between operators using MRU and preference lists may be implemented in the form of programming and associated list data for controlling operations of a mobile station device. An example of the device has been discussed above relative to FIG. 3. As mentioned earlier, the relevant software (programming and/or list data) may be downloaded and/or updated from a computer platform, for example, from an OTAF server or the like communicating with the mobile station via the network. Although special purpose devices may be used to support the download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various technology and system or network selection lists. The programming code is executable by the microprocessor 112 of the mobile station, e.g. from storage in the flash memory 114. For downloading and installation, however, the software is stored within the general-purpose computer platform or the like serving as the OTAF system.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile station, for example, from the OTAF server or other computer of the network operator into the mobile station(s) of the operator's customer(s). Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

PRL: Preferred Roaming List
PLMN: Public Land Mobile Network
SID: System ID
NID: Network ID
MRU: Most Recently Used
CDMA: Code Divisional Multiple Access
AMPS: Advanced Mobile Phone Service
EV-DO: Evolution Data Optimized
PCS: Personal Communication Service
3GPP: 3rd Generation Partnership Project
PSTN: Public Switched Telephone Network
LTE: Long Term Evolution
GSM: Global System for Mobile communications
UMTS: Universal Mobile Telecommunications System
WAN: Wide Area Network
RAN: Radio Access Network
BTS: Base Transceiver System
PC: Personal Computer
OTAF: Over-The-Air service activation/provisioning Function
XCVR: Transceiver
RAM: Random Access Memory
ROM: Read Only Memory
EEPROM: Electrically Erasable Programmable Read-Only Memory
CPU: Central Processing Unit

What is claimed is:

1. A method of managing a most recently used (MRU) system identification list of a mobile device, comprising:

scanning for available mobile communication network systems and selecting at least one available mobile communication network system found during the scanning, in accordance with a system preference list stored in the mobile device from a carrier providing service to the mobile device;

storing an identification of each selected mobile communication network system in the MRU list in the mobile device;

scanning for available mobile communication network systems and selecting at least one available mobile communication network system in accordance with the MRU;

receiving an update of the system preference list from the carrier providing service, and storing the update of stored system preference list in the mobile device;

periodically comparing an identification of the system selected in accordance with the MRU to the stored update of the system preference list, wherein the periodically comparing further comprises comparing systems and order of systems in the MRU list with systems and order of systems in the system preference list; and upon the identification of the system selected in accordance with the MRU not matching an entry in the stored update of the system preference list:

(a) scanning for available mobile communication network systems and selecting an available mobile communication network system, in accordance with the stored update of the system preference list; and (b) storing an identification of the mobile communication network system selected in accordance with the stored update of the system preference list, in the MRU list in the mobile device.

2. The method of claim 1, wherein a time interval for periodically comparing the identification of the system selected in accordance with the MRU to the stored update of the system preference list corresponds to a time based registration interval.

3. The method of claim 1, wherein the system preference list stored in the mobile device from the carrier providing service to the mobile device is a Preferred Roaming List (PRL).

4. The method of claim 1, wherein the system preference list stored in the mobile device from a carrier providing service to the mobile device is a Public Land Mobile Network (PLMN).

5. A mobile device for mobile wireless communication, the mobile device comprising:

a wireless transceiver for wireless communication via a network;

a processor coupled to the wireless transceiver for controlling wireless communications;

a memory;

instructions in the memory, for causing a processor to control operations mobile device to implement functions for managing a most recently used (MRU) system identification list stored in the memory of the mobile device, the functions comprising:

scanning for available mobile communication network systems and selecting at least one available mobile communication network system found during the scanning, in accordance with a system preference list stored in the mobile device from a carrier providing service to the mobile device;

storing an identification of each selected mobile communication network system in the MRU list in the mobile device;

scanning for available mobile communication network systems and selecting at least one available mobile communication network system in accordance with the MRU;

receiving an update of the system preference list from the carrier providing service, and storing the update of stored system preference list in the mobile device;

periodically comparing an identification of the system selected in accordance with the MRU to the stored update of the system preference list, wherein the periodically comparing further comprises comparing systems and order of systems in the MRU list with systems and order of systems in the system preference list; and upon the identification of the system selected in accordance with the MRU not matching an entry in the stored update of the system preference list:
  (a) scanning for available mobile communication network systems and selecting an available mobile communication network system, in accordance with the stored update of the system preference list; and
  (b) storing an identification of the mobile communication network system selected in accordance with the stored update of the system preference list, in the MRU list in the mobile device.

6. The mobile device of claim 5, wherein a time interval for periodically comparing the identification of the system selected in accordance with the MRU to the stored update of the system preference list corresponds to a time based registration interval.

7. The mobile device of claim 5, wherein the system preference list stored in the mobile device from the carrier providing service to the mobile device is a Preferred Roaming List (PRL).

8. The mobile device of claim 5, wherein the system preference list stored in the mobile device from a carrier providing service to the mobile device is a Public Land Mobile Network (PLMN).

9. An article of manufacture, comprising:
a machine readable storage medium; and
instructions for causing a programmable mobile device to implement functions for a most recently used (MRU) system identification list of the mobile device, comprising:
scanning for available mobile communication network systems and selecting at least one available mobile communication network system found during the scanning, in accordance with a system preference list stored in the mobile device from a carrier providing service to the mobile device;

storing an identification of each selected mobile communication network system in the MRU list in the mobile device;

scanning for available mobile communication network systems and selecting at least one available mobile communication network system in accordance with the MRU;

receiving an update of the system preference list from the carrier providing service, and storing the update of stored system preference list in the mobile device;

periodically comparing an identification of the system selected in accordance with the MRU to the stored update of the system preference list, wherein the periodically comparing further comprises comparing systems and order of systems in the MRU list with systems and order of systems in the system preference list; and upon the identification of the system selected in accordance with the MRU not matching an entry in the stored update of the system preference list:
  (a) scanning for available mobile communication network systems and selecting an available mobile communication network system, in accordance with the stored update of the system preference list; and
  (b) storing an identification of the mobile communication network system selected in accordance with the stored update of the system preference list, in the MRU list in the mobile device.

10. The article of claim 9, wherein a time interval for periodically comparing the identification of the system selected in accordance with the MRU to the stored update of the system preference list corresponds to a time based registration interval.

11. The article of claim 9, wherein the system preference list stored in the mobile device from a carrier providing service to the mobile device is a Preferred Roaming List (PRL).

12. The article of claim 9, wherein the system preference list stored in the mobile device from the carrier providing service to the mobile device is a Public Land Mobile Network (PLMN).

* * * * *